United States Patent
Patnaik

(10) Patent No.: US 12,481,518 B2
(45) Date of Patent: Nov. 25, 2025

(54) DIRECT LOADING OF CLIENT CLOUD FILES IN A REMOTE DESKTOP

(71) Applicant: Microsoft Technology Licensing, LLC, Redmond, WA (US)

(72) Inventor: Sandeep Patnaik, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 462 days.

(21) Appl. No.: 17/675,881

(22) Filed: Feb. 18, 2022

(65) Prior Publication Data

US 2023/0266986 A1    Aug. 24, 2023

(51) Int. Cl.
*G06F 9/46* (2006.01)
*G06F 9/451* (2018.01)
*G06F 9/455* (2018.01)

(52) U.S. Cl.
CPC .......... *G06F 9/45558* (2013.01); *G06F 9/452* (2018.02); *G06F 2009/45595* (2013.01)

(58) Field of Classification Search
CPC ................. G06F 9/45558; G06F 9/452; G06F 2009/45595
See application file for complete search history.

(56) References Cited

U.S. PATENT DOCUMENTS

| | | | |
|---|---|---|---|
| 9,225,707 B1 | 12/2015 | De et al. | |
| 11,720,291 B2* | 8/2023 | Momchilov | G06F 3/0635 |
| | | | 726/2 |
| 2016/0127447 A1* | 5/2016 | Jiang | G06F 9/452 |
| | | | 709/203 |
| 2020/0358779 A1* | 11/2020 | Momchilov | G06F 9/45558 |
| 2021/0224233 A1* | 7/2021 | Bafna | G06F 16/164 |
| 2021/0374100 A1 | 12/2021 | Liu et al. | |

OTHER PUBLICATIONS

"Avoid user to save files locally?", Retrieved from: https://community.spiceworks.com/topic/1981263-avoid-user-to-save-files-locally?page=1#entry-6783058, Apr. 4, 2017, 6 pages.

(Continued)

*Primary Examiner* — Diem K Cao
(74) *Attorney, Agent, or Firm* — Schwegman Lundberg & Woessner, P.A.

(57) ABSTRACT

Methods, systems, and computer programs are presented for loading a file directly from the cloud storage to a cloud server executing a virtual machine (VM). One method, performed by a remote desktop application executing on a client device, includes detecting an input for opening a file of the client device at a VM associated with the remote desktop application. The VM executes on a VM server. Further, the method detects that the file is stored on cloud storage at a cloud storage server, and the remote desktop sends to the VM server a request to open the file at the VM with an application associated with the file. The request comprises an identifier in cloud storage of the file. The method further includes an operation for causing presentation of a user interface (UI) of the application in the remote desktop application, the UI comprising information about the opened file.

18 Claims, 10 Drawing Sheets

(56) References Cited

OTHER PUBLICATIONS

"Desktop and Documents folder Redirection and Syncing", Retrieved from: https://community.spiceworks.com/topic/1981651-desktop-and-documents-folder-redirection-and-syncing, Apr. 5, 2017, 7 Pages.

"How to restrict Local Drive redirection and clipboard to Remote Server from client's machine", Retrieved from: https://social.technet.microsoft.com/Forums/windowsserver/en-US/9f9a1b8a-791d-4eeb-b755-5537341896f2/how-to-restrict-local-drive-redirection-and-clipboard-to-remote-server-from-clients-machine, Retrieved Date: Oct. 18, 2021, 9 Pages.

"Share Access to Local Folders and Drives with Client Drive Redirection", Retrieved from: https://docs.vmware.com/en/VMware-Horizon-Client-for-Chrome/2111/chrome-client-installation/GUID-F1361CBF-81B6-452E-A5D7-FFA9AC69D07E.html, Retrieved Date: Oct. 18, 2021, 3 Pages.

"Supported Remote Desktop RDP file settings", Retrieved from: https://docs.microsoft.com/en-us/windows-server/remote/remote-desktop-services/clients/rdp-files#device-redirection, Dec. 24, 2021, 17 Pages.

"Using redirection in Azure RemoteApp", Retrieved from: https://remoteapp.readthedocs.io/en/stable/remoteapp-redirection/, Retrieved Date: Oct. 18, 2021, 5 Pages.

"WVD—Transfer files with the web client-Preview", Retrieved from: https://techgenius.blog/2021/04/25/wvd-transfer-files-with-the-web-client-preview/, Apr. 25, 2021, 4 Pages.

Dutsov, Martin, "TS RemoteApp—Local Desktop redirect to RDP session", Retrieved from: https://social.technet.microsoft.com/Forums/windowsserver/en-US/6b0f5f3e-9bff-4286-a8de-314476a8155e/ts-remoteapp-local-desktop-redirect-to-rdp-session, Dec. 15, 2008, 4 Pages.

Kjerland, et al., "Manage RDP device redirections for Cloud PCs", https://docs.microsoft.com/en-us/windows-365/enterprise/manage-rdp-device-redirections, Dec. 10, 2021, 4 Pages.

Lohr, et al., "Compare the clients: redirections", Retrieved from: https://docs.microsoft.com/en-us/windows-server/remote/remote-desktop-services/clients/remote-desktop-app-compare, Jan. 11, 2022, 4 Pages.

Stahl, Michael, "Configuring Printer Redirection for a Remote Desktop Session (Windows Embedded Compact 7)", Retrieved from: https://social.technet.microsoft.com/wiki/contents/articles/3452.configuring-printer-redirection-for-a-remote-desktop-session-windows-embedded-compact-7.aspx, Jun. 15, 2011, 2 Pages.

Sharkey, et al., "Distributed File System (DFS) Functions", Retrieved from: https://docs.microsoft.com/en-us/windows/win32/dfs/distributed-file-system-dfs-functions, Jan. 7, 2021, 2 Pages.

"Configuring Local resource redirection", Retrieved from: https://techcommunity.microsoft.com/t5/azure-virtual-desktop/configuring-local-resource-redirection/m-p/1486700, Jun. 24, 2020, 5 Pages.

"International Search Report and Written Opinion Issued in PCT Application No. PCT/US22/051031", Mailed Date: Mar. 1, 2023, 12 Pages.

* cited by examiner

DIRECT LOADING OF CLIENT CLOUD FILES IN A REMOTE DESKTOP

CROSS-REFERENCE TO RELATED APPLICATIONS

This application is related by subject matter to U.S. patent application Ser. No. 17/675,855 filed on the same day as the instant application and entitled "Execution Redirection in a Remote Desktop," which is incorporated by reference.

TECHNICAL FIELD

The subject matter disclosed herein generally relates to methods, systems, and machine-readable storage media for managing files in a remote-desktop environment.

BACKGROUND

In virtual desktop environments, end-users utilize a client computer to connect to a virtual machine (VM) running on server hardware to provide added compute power, application compatibility, security and regulatory compliance, and reduce overall compute costs.

Virtual machines (VMs) are an excellent tool for providing inexpensive computing capabilities. Unfortunately, there are several classes of applications that do not work will in virtualized environments, such as real-time communications applications, applications handling large files, media-display applications, web-media presentations, graphically intensive applications (e.g., CAD, design tools, games), applications that transmit a large amount of data between the server and the client endpoint (e.g., file compression), etc. These applications result in poor user experiences and high computer-resource usage.

Often, users have files on their client computer that can only open with an application available in the VM, and the application needs the file to be loaded in the server computer to make it available to the VM. The files have to be copied from the client computer to server computer.

There are multiple problems with this file-loading approach that results in bad user experiences, such as:
 If the file is large, the copy to the server could fail (e.g., loss of network connectivity);
 Depending on the network bandwidth available between client and server, the file transfer could take a long time, sometimes even hours (e.g., 1 GB PowerPoint file over a 256 kbps connection);
 For files that are stored in cloud storage, the file has to be downloaded to the client computer, and then from the client computer to the cloud server;
 File transfers cost money to VM users and could be expensive for larger files; and
 File transfers use up valuable computing resources on the client computer and the cloud-service computers.

BRIEF DESCRIPTION OF THE DRAWINGS

Various of the appended drawings merely illustrate example embodiments of the present disclosure and cannot be considered as limiting its scope.

DETAILED DESCRIPTION

Example methods, systems, and computer programs are directed to loading a file directly from the cloud storage to the cloud server executing the VM, referred to herein as the VM server. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one aspect, when files are in cloud storage, embodiments eliminate the need to copy data for these cloud files from the client device to the VM server. Instead, the client device sends the location of the cloud file to the VM server, and the VM server downloads the cloud file directly from the cloud storage. This results in a better use of resources and improved customer experience.

As a result, embodiments provide differentiated value because there is no file transfer from the client device, resulting in the following benefits:
 the application on the server computer will launch the file faster, resulting in improved end-user experience;
 improved network bandwidth utilization and other computer resources that result in lowered cost of operation for the user;
 lower probability of file corruption because the client device is bypassed; and
 in some environments, the cloud files stay within security boundaries (that include the VM server and the cloud storage) defined by an Information Technology (IT) department.

One general aspect includes a method, performed by a remote desktop application executing on a client device, that includes an operation for detecting an input for opening a file of the client device at a virtual machine (VM) associated with the remote desktop application. The VM executes on a VM server. Further, the method includes an operation for detecting that the file is stored on cloud storage at a cloud storage server. Further, the remote desktop sends to the VM server a request to open the file at the VM with an application associated with the file. The request comprises an identifier in cloud storage of the file. The method further includes an operation for causing presentation of a user interface (UI) of the application in the remote desktop application, the UI comprising information about the opened file.

Figure 1:
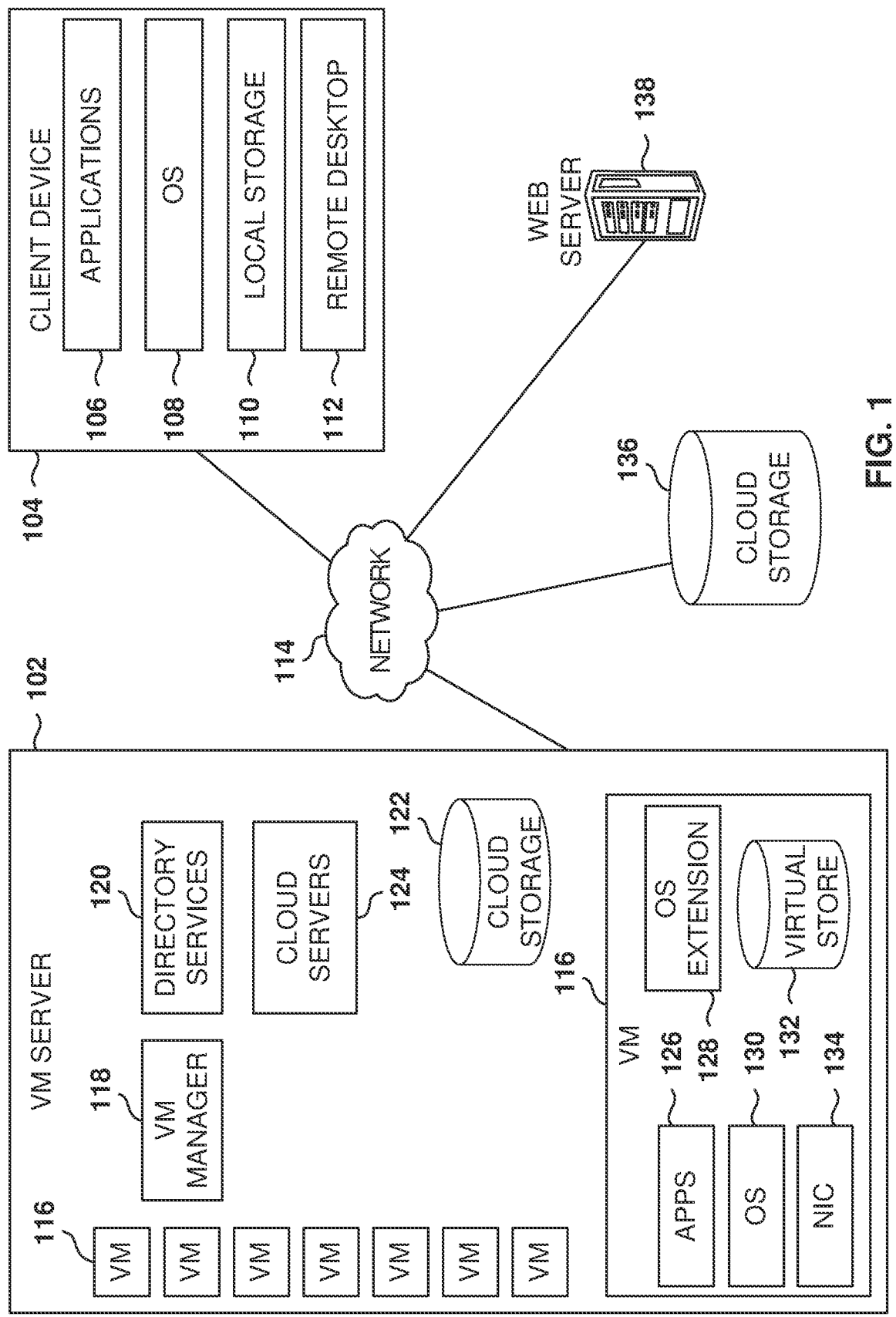
FIG. 1 is a simplified diagram of a computer environment for deployment of virtual machines (VMs), according to some example embodiments.

FIG. 1 is a simplified diagram of a computer environment for deployment of virtual machines (VMs), according to some example embodiments. A VM server 102 provides multiple services, including the deployment of a plurality of VMs 116. Although a single VM server 102 is presented, the services may be provided by a plurality of servers cooperating in a distributed fashion.

One example of a VM provider is Azure™ from Microsoft™ to provision Windows™ or Linux™ VMs. Some of the embodiments are presented with reference to Azure, but the same principles may be used for other VM services.

A client device 104 may be used to access the VM server 102 via a network 114 such as the Internet. The client device 104 includes an operating system (OS) 108 to enable executing applications 106 on the client device 104. If the client device 104 provisions a VM 116 on the VM server 102, the VM 116 may be accessed through terminal services, including a window of a remote desktop 112 that presents the user interface that the VM machine 116 provides. The client device 104 further includes local storage 110.

Terminal Services, also known as Remote Desktop Services in Windows Server, is a component of Microsoft Windows that allows a user to access applications and data on a remote computer over a network. Windows applications, or the entire desktop of the computer running Terminal Services, are made accessible to a remote client device 104, such as via the remote desktop 112. With Terminal Services, the user interface of an application is presented at the client. Any input to it is redirected over the network to the server, where application execution takes place.

The VM server 102 further includes a VM manager 118, directory services 120, one or more cloud servers 124, and cloud storage 122. The VM manager is responsible for configuring, provisioning, managing, monitoring, and de-provisioning the VMs 116. Directory services 120 implement the Azure Active Directory (Azure AD) enterprise identity service that provides user management, single sign-on, multi-factor authentication, and other directory-related services.

As used herein, cloud storage refers to a model of computer data storage in which the digital data is stored in logical pools, said to be on "the cloud." The physical storage may span multiple servers that may be in multiple locations, and the physical environment is typically owned and managed by a hosting company. The cloud storage providers are responsible for keeping the data available and accessible, and the physical environment secured, protected, and running. People and organizations buy or lease storage capacity from the providers to store user, organization, or application data.

Cloud storage services may be accessed through a colocated cloud computing service, a web service application programming interface (API) or by applications that use the API, such as cloud desktop storage, a cloud storage gateway or web-based content management systems. Cloud storage is sometimes called network storage, as the data is stored on a server separate from the client device and the data is accessed over the network.

One or more cloud servers 124 provide the computing resources for implementing the services of the cloud service. Further, cloud storage 122 allows users to store data on the cloud. The data in the cloud storage 122 may also be configured to be accessed by the VMs 116.

Additionally, the client device 104 may access other cloud storage 136 provided by a different entity than the cloud service provider. Further, the client device 104 and the VMs 116 may access other servers 138 (e.g., web server) via the network 114.

The VM 116 includes an OS 130, executing applications 126, an OS extension 128 that implements remote-desktop features, a network interface card (NIC) 134 to communicate via a virtual network, and virtual store 132 for storing the data of the VM 116. In some embodiments, all or some of the OS extension 128 features are integrated within the OS 130.

Figure 2:
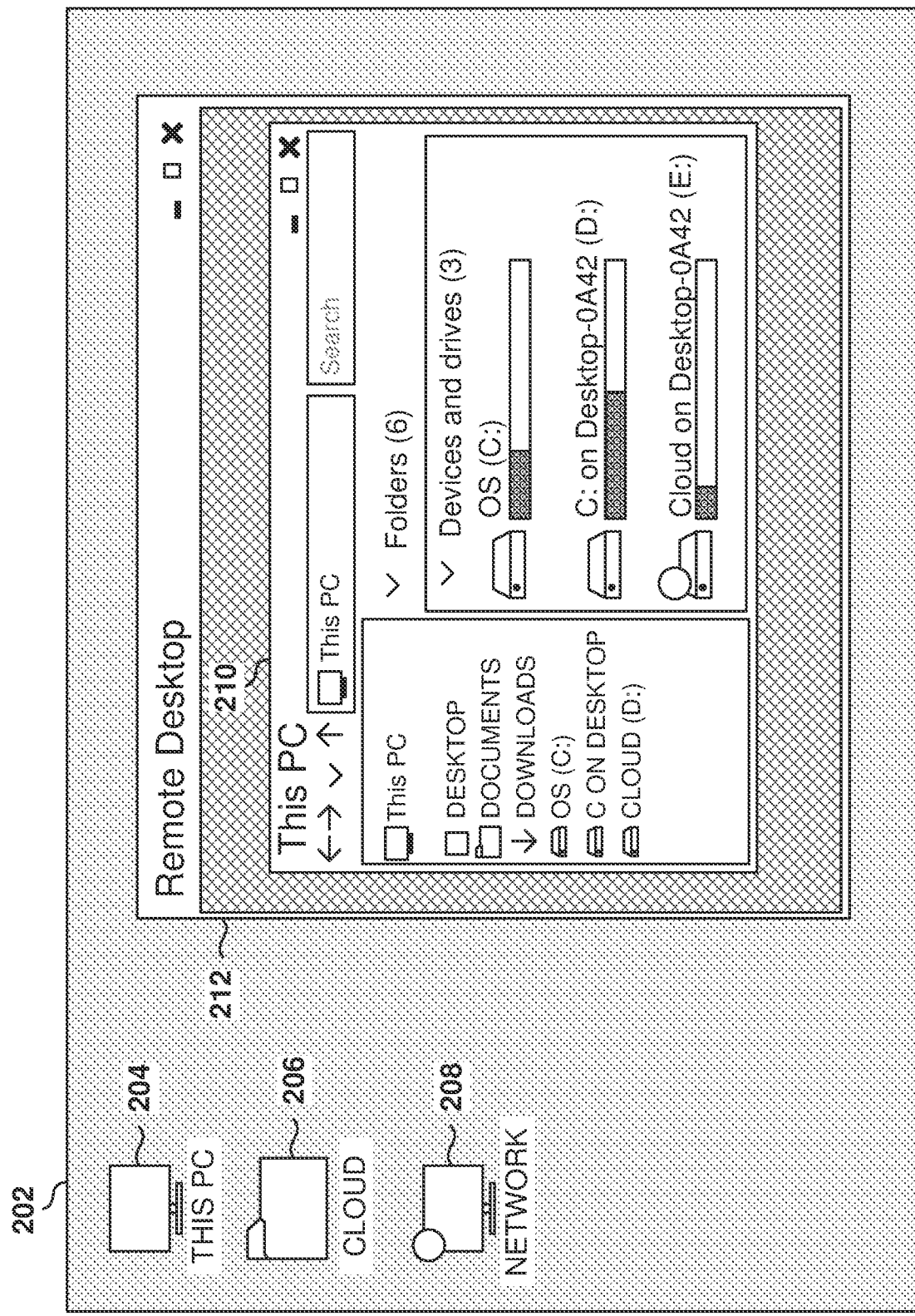
FIG. 2 is a user interface (UI) showing cloud storage on the local client device accessible by the VM, according to some example embodiments.

FIG. 2 is a UI 102 showing cloud storage on the local client device accessible by the VM, according to some example embodiments. The UI 202 corresponds to the desktop view of the client device 104.

In the illustrated example, the UI 202 includes the remote desktop window 212 for interfacing with the remote VM. Further, the UI 202 presents a desktop for the OS executing on the computing device. The desktop includes several folders, such as "This PC" folder 204 for accessing the file system of the client device, a cloud folder 206 for accessing a file directory provided by a cloud service, and a network folder for presenting network information of the client device.

The cloud service stores the files of the user in a remote location, such as a cloud storage server. In some cases, the files in the remote location may be synchronized with a local folder that stores copies of all or some of the files in the cloud storage, that is, the cloud service guarantees that the copies on the cloud storage and the local machine are the same. This way, when a client device accesses a file from the cloud storage, the local copy may be used if the local copy is current.

In this example, the remote desktop window 212 includes a "This PC" file folder 210 with information on the file system of the VM. The file system of the VM includes a local C: drive (local to the VM), a D: drive that corresponds to the C: drive on the client device named Desktop-0A42, and a drive E: that corresponds to the cloud storage of the client device.

Thus, the VM is able to access both the hard drive on the client device, as well as the network storage of the client device. For example, the VM may click on the E: drive and open a file (e.g., a spreadsheet) kept on the cloud folder. However, in solutions available today, the client device will copy the file from cloud storage to the client device, and then the VM server will upload the file from the client device for the VM to access. Thus, the file has to be transferred over the network twice. Even if there is a local copy of the file on the cloud folder 206, the file will have to be uploaded once to the VM server.

To avoid having to transfer the cloud file twice and leverage the services of the cloud storage provider, in some embodiments, the identifier of the cloud file (e.g., a Uniform Resource Identifier (URI)) is passed to the VM server, and the VM server, which has access to the cloud storage, downloads the file directly from the cloud storage, saving time and resources for the client device. For example, direct download from the cloud storage could mean a difference of transferring 2 KB from the client device instead of transferring 600 MB, or more if the file is bigger.

Figure 3:
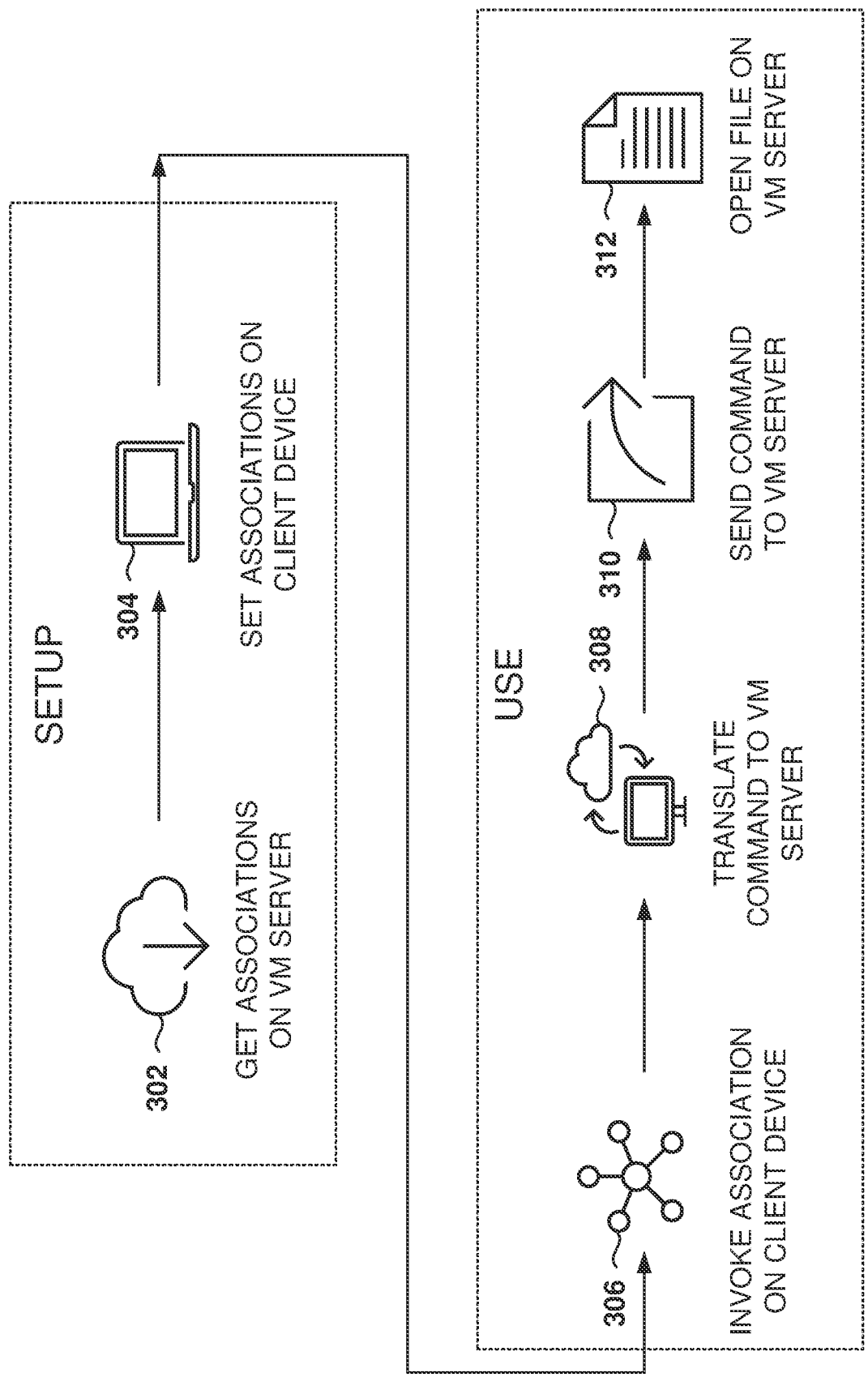
FIG. 3 illustrates how to access cloud storage by the VM, according to some example embodiments.

FIG. 3 illustrates how to access cloud storage by the VM, according to some example embodiments. During setup, operations 302 and 304 are performed.

Associations refer to mapping a file type (e.g., as defined by its extension in the file name) to the application that will open the file when the file is selected for opening.

At operation 302, the VM server collects information on the associations available for the VM, that is, which programs are available for opening files and the information is stored by the VM server, e.g., in a database. At operation 304, the associations available for the VM are configured in the remote desktop executing on the client device.

During use of the redirection option for opening files from the cloud server, operations 306, 308, 310, and 312 are performed. At operation 306, the remote desktop, executing on the client device, invokes an association to open a certain file selected by the user on the remote desktop window. At operation 308, the command is translated by the remote desktop (e.g., formatted for transmittal to the server with instructions to open an application with the given file), and, at operation 308, the remote desktop sends the request to the VM server with information about the location of the filed to be opened (e.g., the location of the file on cloud storage).

At operation 312, the VM server opens the requested file after retrieving the file from the cloud storage. More details on the sequence for opening a file on cloud storage are provided below with reference to FIG. 7.

It is noted that embodiments are described with reference to remote desktops, but the same principles may be applied to remote-application environments where the window of an application is presented instead of the desktop on the VM.

Figure 4:
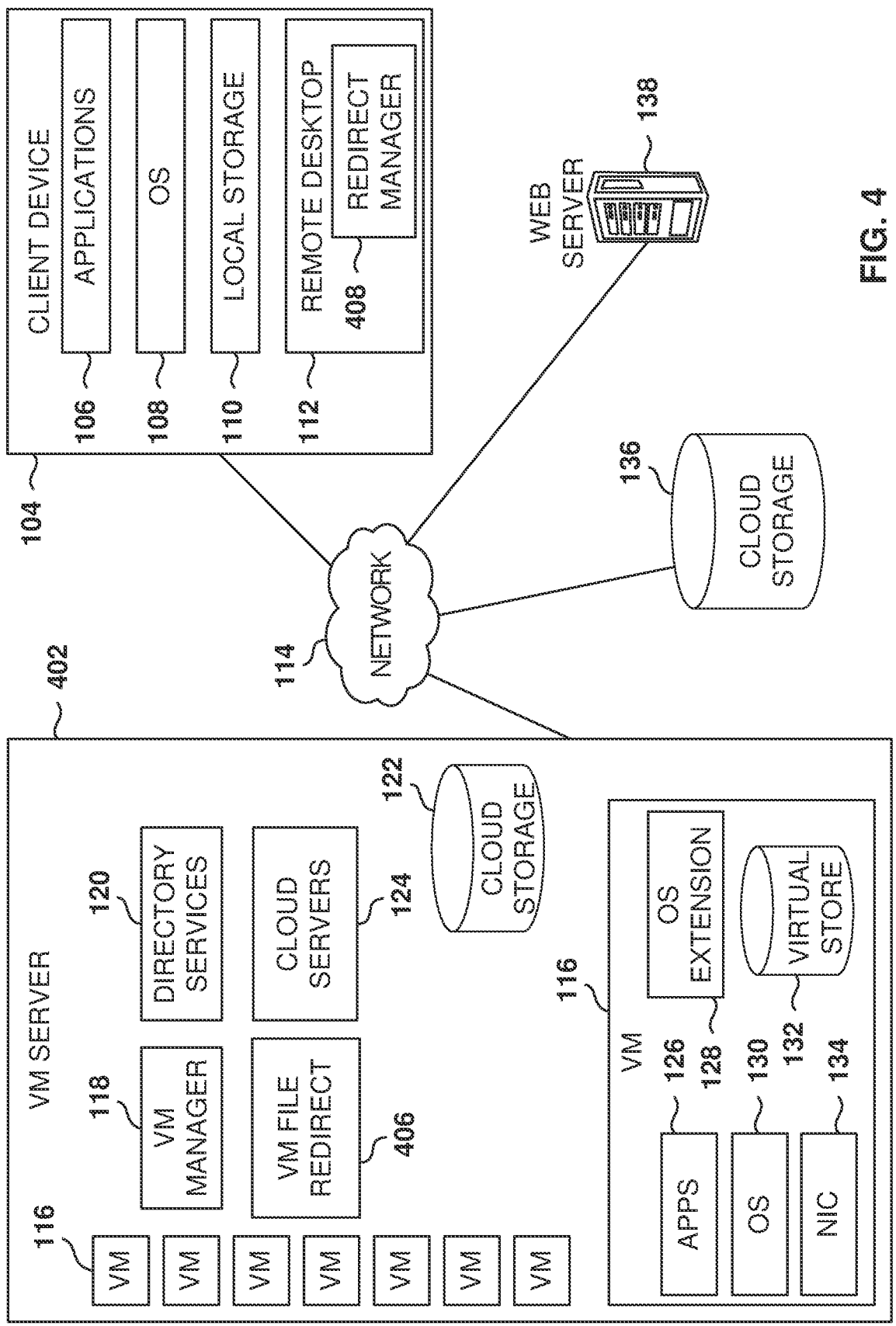
FIG. 4 is a diagram of a computer environment with file-redirect logic for redirecting the loading of cloud storage in the VM, according to some example embodiments.

FIG. 4 is a diagram of a computer environment with file-redirect logic for redirecting the loading of cloud storage in the VM, according to some example embodiments. The cloud-service server 402 includes the same modules as the VM server 102 described with reference to FIG. 1, plus a VM file redirect module 406 that loads files directly from cloud storage 122, 136 instead of downloading from the client device 104. The VM file redirect module 406 may be a stand-alone program or be integrated with another program, such as the VM manager 118.

The client device 204 includes the same elements as the client device 104 of FIG. 1 plus redirect manager 408 in remote desktop 112. The redirect manager 408 determines when a file can be uploaded by the VM server 402 directly from cloud storage, instead of sending the file from the client device 104.

Figure 5:
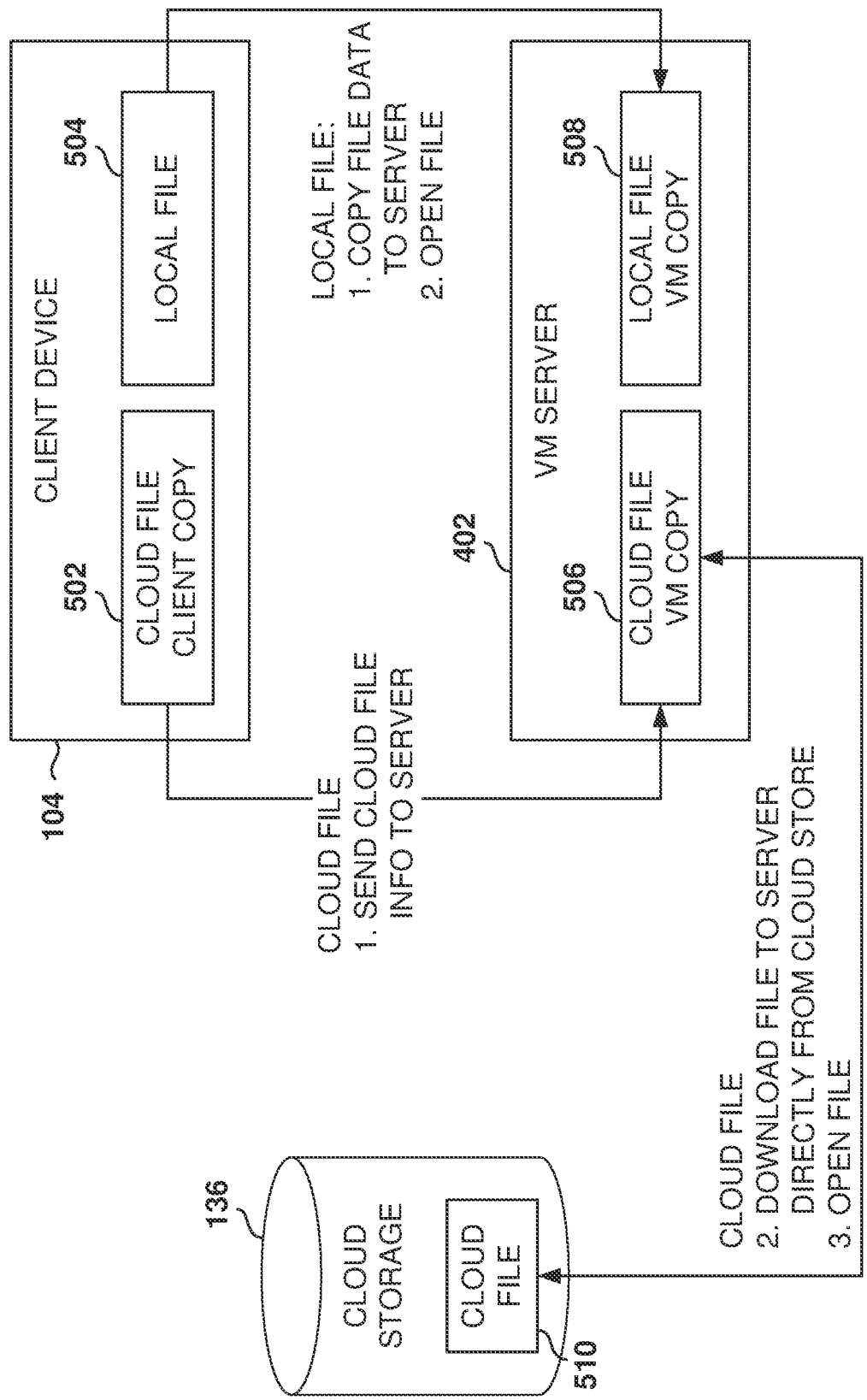
FIG. 5 illustrates the loading of a file from cloud storage in the VM, according to some example embodiments.

FIG. 5 illustrates the loading of a file from cloud storage 136 in the VM, according to some example embodiments. Two of the file types that can be loaded to the VM server 402 are a local file 504 stored on the client device 104, and a cloud file 510 stored on cloud storage 136.

The method to open the local file 504 includes copying the local file 504 to the VM server 402 to get the local file VM copy 508 on the VM server 402, and opening the local file VM copy 508 on the server.

The cloud file 510 may have a copy on the client device 104, referred to as cloud file client copy 502. The cloud file client copy 502 may be a copy of the cloud file 510 (e.g., when the cloud storage is synchronized), or may be a reference to the cloud file 510, and when the client device 104 needs to access the cloud file 510, then the cloud file 510 is copied to the client device 104.

The method to open the cloud file 510 on the VM includes sending the cloud file information from the client device 104 to the VM server 402, and then the VM server downloading the cloud file 510 directly from cloud storage 136 to get cloud file VM copy 506 on the VM server 402. After the file is downloaded, the VM server 402 opens the cloud file VM copy 506 on the VM.

Because there is no file transfer from the client device 104 to the VM server 402, the following benefits are achieved:
the application on the server computer will launch the file faster, resulting in improved end-user experience;
improved network bandwidth utilization and other computer resources that result in lowered cost of operation for the user;
lower probability of file corruption because the client device is bypassed; and
in some environments, the cloud files stay within security boundaries (that include the VM server and the cloud storage) defined by an Information Technology (IT) department.

Figure 6:
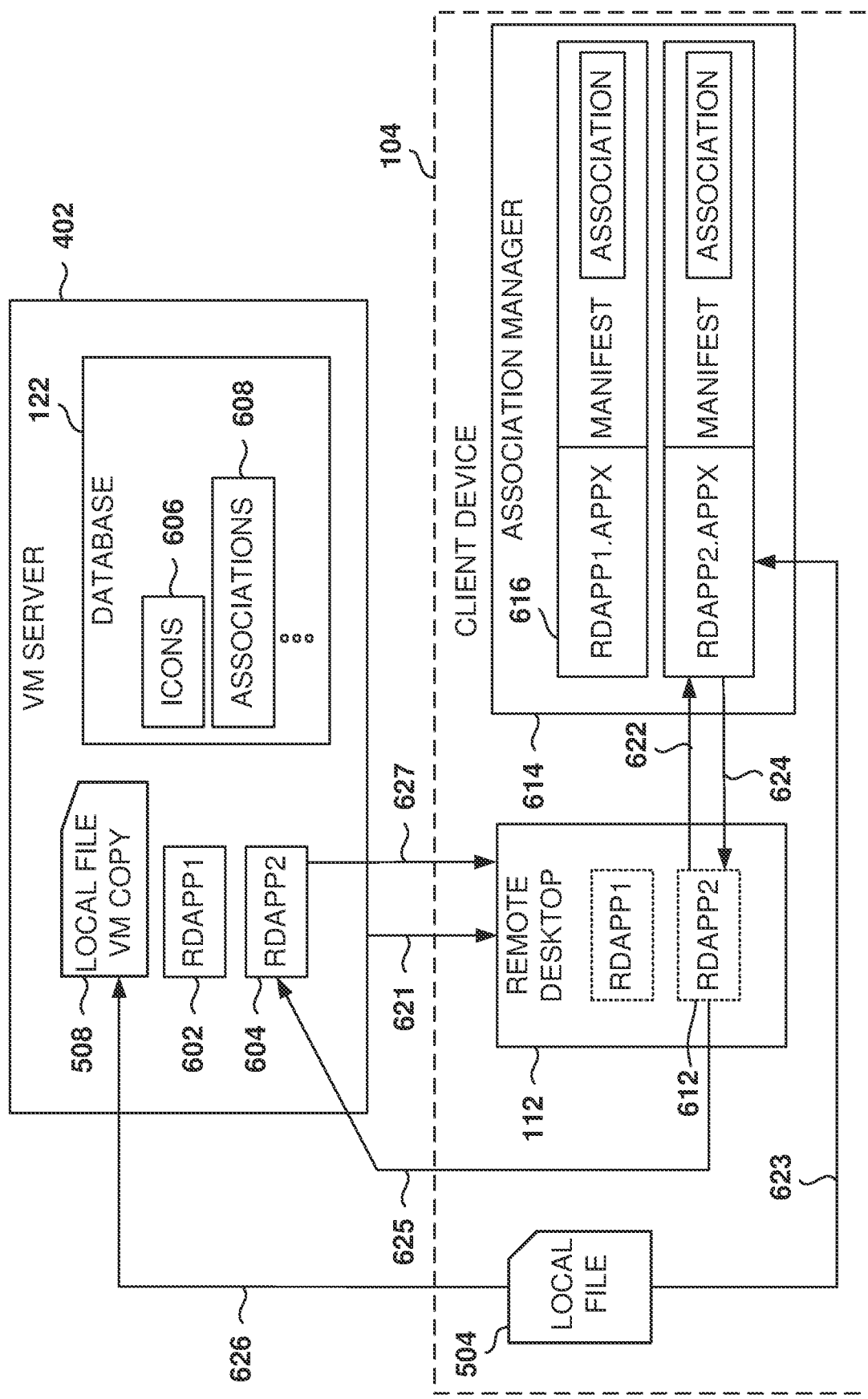
FIG. 6 illustrates the opening of a file stored in the local client device, according to some example embodiments.

FIG. 6 illustrates the opening of a file stored in the local client device 104, according to some example embodiments. In some example embodiments, the client device 104 includes the local file 504, the remote desktop 112, and an association manager 614. In some embodiments, the association manager 614 may be embedded within the remote desktop 112.

The association manager 614 includes association information 616 for the remote desktop that has been downloaded from the VM server 402. The association information 616 includes a manifest that maps applications (e.g., with an extension name ".appx") to the files that each application is configured to open. In one example, the extension.exe is the one used in Windows systems, but other extensions may also be included. In some example embodiments, the manifest is an XML file with a table describing the associations. In the illustrated example, there are two applications RDApp1.appx and RDApp2.appx with their respective manifests.

In some example embodiments, the association manager 614 is the Device Health Attestation (DHA) from Microsoft Windows. DHA is used to manage on-premises devices that are managed with Active Directory, devices managed by Azure Active Directory, or a hybrid deployment using both Active Directory and Azure Active Directory.

The VM server 402 includes applications for execution on the VM, such as applications RDApp1 602 and RDApp2 604. The VM and server 402 further includes a database 122 with information about the associations, icons 606 used by the applications, etc.

In the remote desktop 112, the applications 612 are shown as available for the VM and are executed on the VM server 402 when needed. In this scenario, the local file 504 is to be opened by the VM and associated with one of the applications 612 available on the VM.

Initially, the remote desktop 112 gets 621 the association information and stores 622 the information on the association manager 614. When the user selects 623, on the remote desktop 112, the local file 504 on the client device 104 for opening, the association manager 614 launches 624 the application 612 in the remote desktop with the parameters associated with the association for the local file 504.

The remote desktop 112 sends 625 a request to the VM server 402 to open the local file 504 on the VM with the corresponding application (e.g., application 602, application 604). Further, the remote desktop 112 sends 626 a copy of the local file 504 to the VM server 402 (e.g., over Remote Desktop Program (RDP), but other transfer methods may be used), that is stored as local file VM copy 508. Then, the VM server 402 opens 627 the application (e.g., application 612)

on the VM with the local file VM copy 508. The application is then shown in the remote desktop 112.

Figure 7:
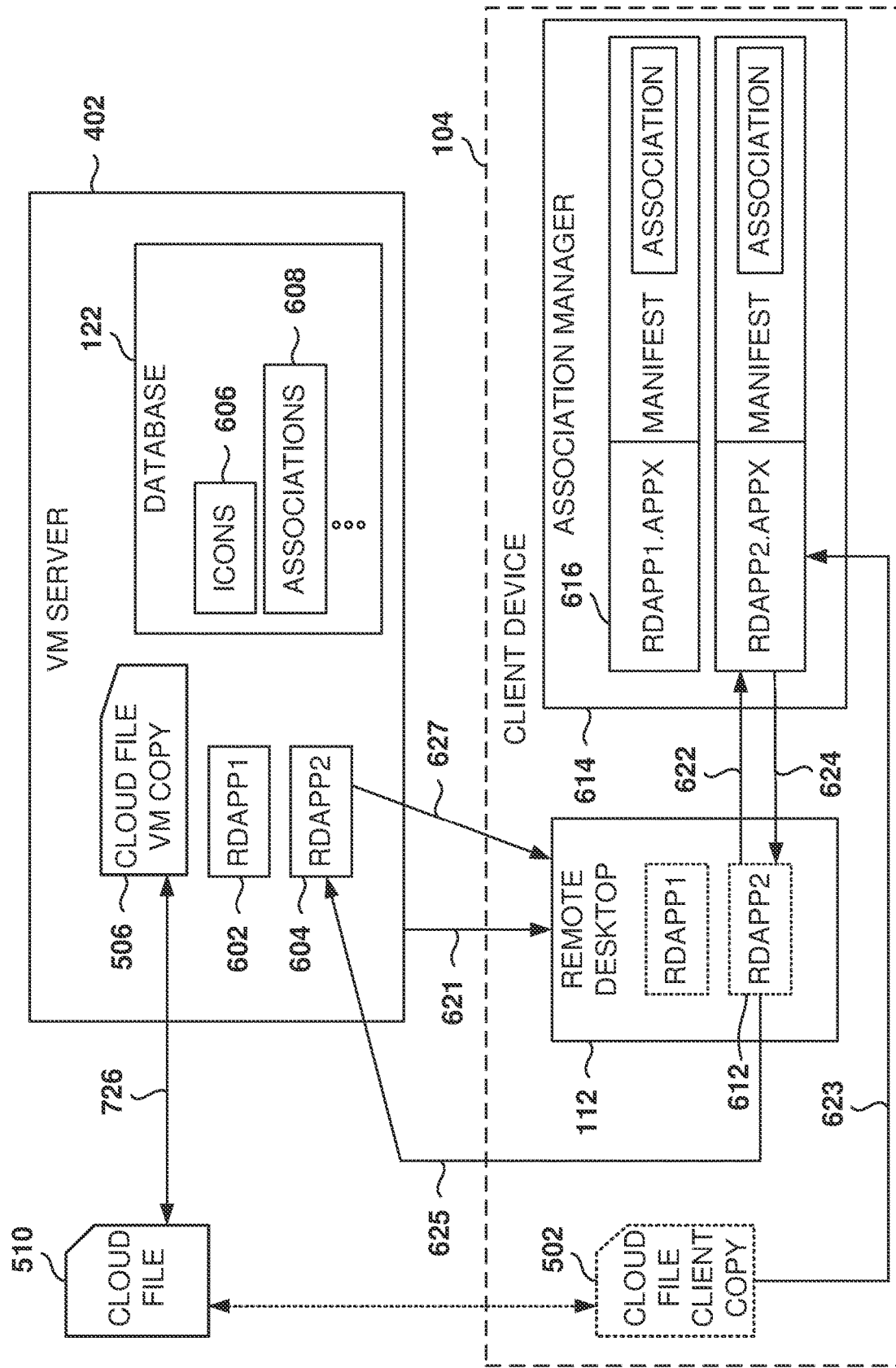
FIG. 7 illustrates the loading of a file from cloud storage directly into the VM server, according to some example embodiments

FIG. 7 illustrates the loading of a file from cloud storage directly into the VM server 402, according to some example embodiments. The cloud file 510 may be present in the client device and the cloud storage, or just in cloud storage. Operations 621-622 are the same as when loading the local file 504 as described above with reference to FIG. 6. At operation 623, the remote desktop detects that the user has selected to open the cloud file client copy 502, which is stored as cloud file 510 at cloud storage.

Operation 624 is the same as described above to obtain the association parameters. For example, the association parameters for a local file 504 that is a Microsoft Excel file is:

ms-excel: ofe|u|C: \Users\john_doe\Document.docx

For the Cloud File 510 File, an Example May be:

ms-excel: ofe|u|https://my.sharepoint-df.com/personal/johndoe_company_A/Documents/01.docx.

At operation 625, the remote desktop 112 sends a request to the VM server 402 to open the cloud file 510 on the VM with the corresponding application (e.g., application 604), and the request includes the location of the cloud file 510.

At operation 726, the VM server downloads the cloud file 510 from storage and stores the transferred file as cloud file VM copy 506. Then, the VM server 402 opens 627 the application 612 on the VM for the cloud file VM copy 506, which is shown in the remote desktop 112.

For example, in the case of a OneDrive™ file, the association manager 616 uses the OneDrive Application Programming Interface (API) to make a call with the local address of the cloud file client copy 502 and obtain the network address for the file in cloud storage (e.g., ms-onedrive: user: <user@compA.com>|<FileURI>).

Although some embodiments are described with reference to opening a file, the same principles may be used to open an application stored in another server. When the request is sent to open the application, instead of transferring the application executable files to the VM server, the execution of the application is redirected to run on a remote dedicated server (e.g., an accounting system, a payroll system).

In other embodiments, the association information kept by the VM server 402 is used to automatically trigger the download of the cloud file 510. Thus, for the remote desktop 112, the operations are the same for opening a local file or a cloud file, but the VM server 402 will detect when the file to open is in cloud storage and will automatically download from cloud storage.

In some embodiments, the remote desktop makes a determination if it would be faster to download the cloud file from the client device or from cloud storage (e.g., due to network bandwidth availability, the cloud storage server being overloaded, etc.). When it would be more efficient to download from the client device 104, the remote desktop 112 will request to upload the copy of the cloud file client copy 502 kept by the client device 104 instead of downloading from the cloud storage.

In some embodiments, if the VM server 402 is not successful in downloading the cloud file 510 from the cloud storage, the VM server 402 will initiate a transfer of the cloud file client copy 502 kept in the client device 104.

In some embodiments, execution of the application is redirected to the client device 104, that is, after the user selects an application to be executed on the remote desktop, the VM server 402 or the remote desktop 112 determine that it would be more efficient to execute the application on the client device instead. The application is then opened on the client device 104 for the selected file. In this execution-redirection scenario for opening the cloud file 510, the client device can open the local copy of the cloud file client copy 502 when available, download the cloud file 510 from cloud storage, or have the VM server obtain the cloud file VM copy 506 and then transfer it to the client device 104.

Figure 8:
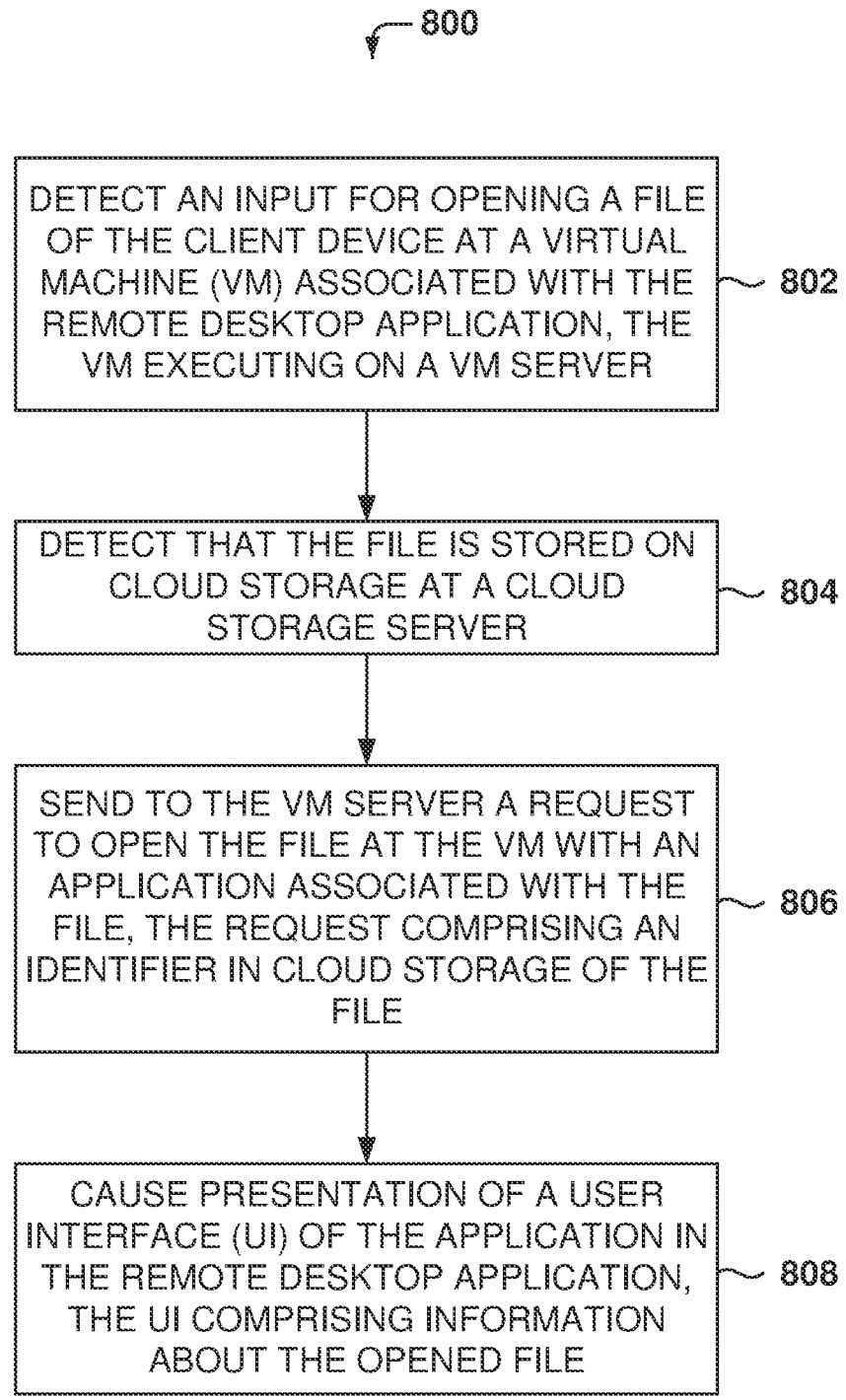
FIG. 8 is a flowchart of a method for loading a file directly from the cloud storage to the cloud server executing the VM, according to some example embodiments.

FIG. 8 is a flowchart of a computer-implemented method 800, performed by a remote desktop application executing on a client device, for loading a file directly from the cloud storage to the cloud server executing the VM, according to some example embodiments. While the various operations in this flowchart are presented and described sequentially, one of ordinary skill will appreciate that some or all of the operations may be executed in a different order, be combined or omitted, or be executed in parallel.

At operation 802, the remote desktop detects an input for opening a file of the client device at a virtual machine (VM) associated with the remote desktop application, the VM executing on a VM server.

From operation 802, the method flows to operation 804 for detecting that the file is stored on cloud storage at a cloud storage server.

From operation 804, the method flows to operation 806 for sending to the VM server a request to open the file at the VM with an application associated with the file. The request comprises an identifier in cloud storage of the file.

Because there is no file transfer from the client device 104 to the VM server 402, the application on the server computer will launch the file faster, resulting in improved end-user experience. Also, network bandwidth utilization and reduced use of other computer resources are improved resulting in lowered cost of operation for the user.

From operation 806, the method flows to operation 808 for causing presentation of a UI of the application in the remote desktop application, the UI comprising information about the opened file.

In one example, the method 800 further comprises, detecting a new input for opening a local file stored in a local drive of the client device; sending to the VM server a request to open the local file; and when the determination is that the file is not stored in the cloud storage and that the file is stored in a local drive of the client device, sending the local file stored in the local drive of the client device to the VM server.

In one example, the VM server is configured to download the file directly from the cloud storage in response to receiving the request without downloading the file from the client device.

In one example, the method 800 further comprises, before detecting the input, downloading, by the remote desktop application from the VM server, association information defining which application is configured to open a file based on a type of the file.

In one example, the method 800 further comprises making an application programming interface (API) call, to a cloud storage application executing on the remote desktop application, to obtain the identifier in cloud storage of the file.

In one example, the method 800 further comprises determining, by the remote desktop application, which application is configured to open the file based on association information obtained from the VM server matching application programs to files based on an extension of the file.

In one example, the file stored in cloud storage is in a folder at the client device synchronized with the cloud storage.

In one example, the method 800 further comprises, when the download from cloud storage to the VM server fails, downloading a copy of the file stored on the client device.

Another general aspect is for a system that includes a memory comprising instructions and one or more computer processors. The instructions, when executed by the one or more computer processors, cause the one or more computer processors to perform operations comprising: detecting, by a remote desktop application executing on a client device, an input for opening a file of the client device at a virtual machine (VM) associated with the remote desktop application, the VM executing on a VM server; determining if the file is stored on cloud storage at a cloud storage server; sending, based on the determination, by the remote desktop application to the VM server, a request to open the file by executing at the VM an application associated with the file, the request comprising cloud storage file information for downloading the file directly from the cloud storage to the VM server; and causing presentation of a user interface (UI) of the application in the remote desktop application.

In yet another general aspect, a machine-readable storage medium (e.g., a non-transitory storage medium) includes instructions that, when executed by a machine, cause the machine to perform operations comprising: detecting, by a remote desktop application executing on a client device, an input for opening a file of the client device at a virtual machine (VM) associated with the remote desktop application, the VM executing on a VM server; determining if the file is stored on cloud storage at a cloud storage server; sending, based on the determination, by the remote desktop application to the VM server, a request to open the file by executing at the VM an application associated with the file, the request comprising cloud storage file information for downloading the file directly from the cloud storage to the VM server; and causing presentation of a user interface (UI) of the application in the remote desktop application.

In view of the disclosure above, various examples are set forth below. It should be noted that one or more features of an example, taken in isolation or combination, should be considered within the disclosure of this application.

Figure 9:
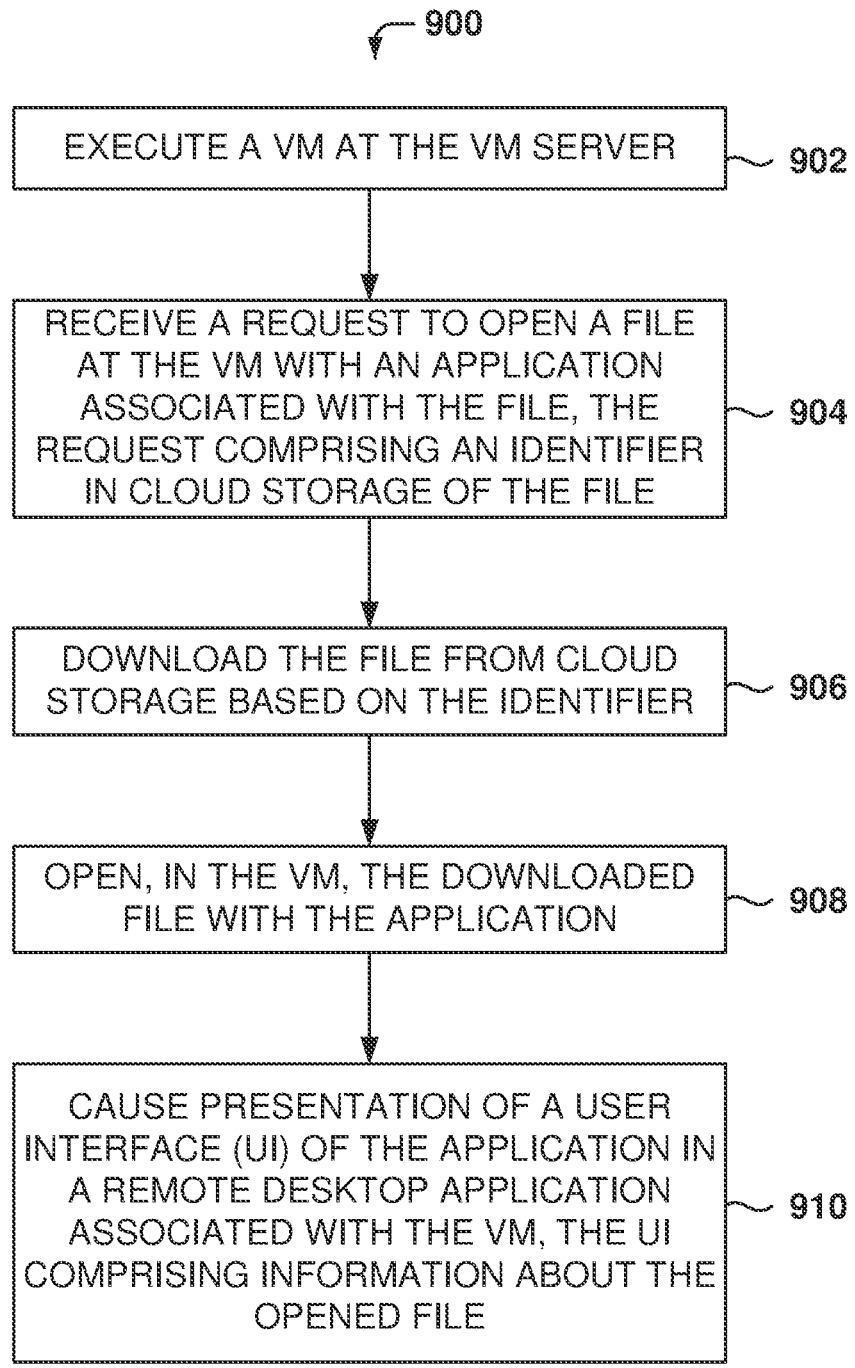
FIG. 9 is a flowchart of a method for loading a file directly from the cloud storage to the cloud server executing the VM, according to some example embodiments.

FIG. 9 is a flowchart of a method 900 for loading a file directly from the cloud storage to the cloud server executing the VM, according to some example embodiments. Operation 902 is for executing a VM at the VM server.

From operation 902, the method 900 flows to operation 904 for receiving a request to open a file at the VM with an application associated with the file. The request comprises an identifier in cloud storage of the file.

From operation 904, the method 900 flows to operation 906 for downloading the file from cloud storage based on the identifier.

From operation 906, the method 900 flows to operation 908 to open, in the VM, the downloaded file with the application.

From operation 908, the method 900 flows to operation 910 for causing presentation of a user interface (UI) of the application in a remote desktop application associated with the VM. The UI comprises information about the opened file.

In one example, the method 900 further comprises receiving a new request for opening a local file stored in a local drive of a client device executing the remote desktop application; receiving the local file; and opening, in the VM, the local file with the application.

In one example, the method 900 further comprises downloading association information defining which application is configured to open a file at the VM based on a type of the file.

In one example, the file stored in cloud storage is in a folder, at a client device executing the remote desktop application, synchronized with the cloud storage.

In one example, the method 900 further comprises, when the download of the file from cloud storage fails, downloading a copy of the file stored on a client device executing the remote desktop application.

Figure 10:
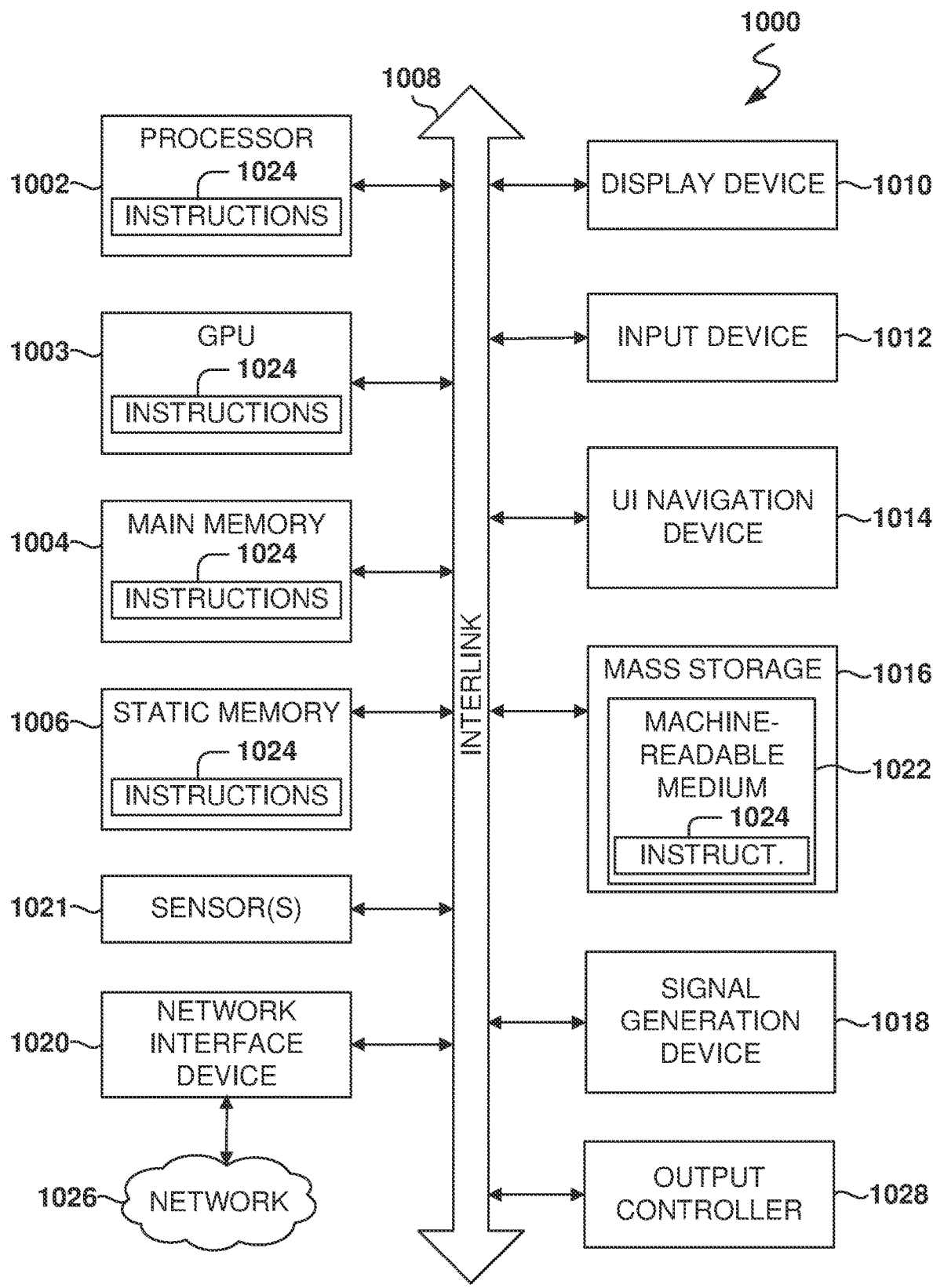
FIG. 10 is a block diagram illustrating an example of a machine upon or by which one or more example process embodiments described herein may be implemented or controlled.

FIG. 10 is a block diagram illustrating an example of a machine 1000 upon or by which one or more example process embodiments described herein may be implemented or controlled. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in a peer-to-peer (P2P) (or other distributed) network environment. Further, while only a single machine 1000 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1000 may include a hardware processor 1002 (e.g., a central processing unit (CPU), a hardware processor core, or any combination thereof), a graphics processing unit (GPU) 1003, a main memory 1004, and a static memory 1006, some or all of which may communicate with each other via an interlink (e.g., bus) 1008. The machine 1000 may further include a display device 1010, an alphanumeric input device 1012

(e.g., a keyboard), and a user interface (UI) navigation device 1014 (e.g., a mouse). In an example, the display device 1010, alphanumeric input device 1012, and UI navigation device 1014 may be a touch screen display. The machine 1000 may additionally include a mass storage device (e.g., drive unit) 1016, a signal generation device 1018 (e.g., a speaker), a network interface device 1020, and one or more sensors 1021, such as a Global Positioning System (GPS) sensor, compass, accelerometer, or another sensor. The machine 1000 may include an output controller 1028, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1016 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, within the hardware processor 1002, or within the GPU 1003 during execution thereof by the machine 1000. In an example, one or any combination of the hardware processor 1002, the GPU 1003, the main memory 1004, the static memory 1006, or the mass storage device 1016 may constitute machine-readable media.

While the machine-readable medium 1022 is illustrated as a single medium, the term "machine-readable medium" may include a single medium, or multiple media, (e.g., a centralized or distributed database, and/or associated caches and servers) configured to store the one or more instructions 1024.

The term "machine-readable medium" may include any medium that is capable of storing, encoding, or carrying instructions 1024 for execution by the machine 1000 and that cause the machine 1000 to perform any one or more of the techniques of the present disclosure, or that is capable of storing, encoding, or carrying data structures used by or associated with such instructions 1024. Non-limiting machine-readable medium examples may include solid-state memories, and optical and magnetic media. In an example, a massed machine-readable medium comprises a machine-readable medium 1022 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method performed by a remote desktop application executing on a client device, the method comprising:
   downloading, by the remote desktop application, from a virtual machine (VM) server and to an association manager on the client device, association information defining which application is configured to open a file based on a type of the file;
   detecting an input for opening a first file of the client device at a VM associated with the remote desktop application, the VM executing on the VM server;
   detecting that the first file is a local copy of a cloud-based file stored on cloud storage at a cloud storage server;
   determining, by the remote desktop application and based on the association information, an application associated with the first file and configured to open the first file, wherein the association information comprises a manifest associated with the application;
   sending to the VM server a request to open the first file at the VM with the application, the request comprising an identifier of the cloud-based file in cloud storage of the first file rather than a path to the first file on the client device; and
   causing presentation of a user interface (UI) of the application in the remote desktop application, the UI comprising information about the opened first file.

2. The computer-implemented method as recited in claim 1, further comprising:
   detecting a new input for opening a second file, the second file being a local file stored in a local drive of the client device;

sending to the VM server a request to open the second file; and sending the second file to the VM server.

3. The computer-implemented method as recited in claim 1, wherein the VM server is configured to download the cloud-based file directly from the cloud storage in response to receiving the request without downloading the first file from the client device.

4. The computer-implemented method as recited in claim 3, further comprising:
when the download from cloud storage to the VM server fails, downloading a copy of the first file stored on the client device.

5. The computer-implemented method as recited in claim 1, further comprising:
making an application programming interface (API) call, to a cloud storage application executing on the remote desktop application, to obtain the identifier of the cloud-based file in cloud storage.

6. The computer-implemented method as recited in claim 1, wherein the first file stored in cloud storage is in a folder at the client device synchronized with the cloud storage.

7. The computer-implemented method as recited in claim 1, wherein the manifest associated with the application comprises an association for the first file and associating the first file with a parameter indicating the identifier in cloud storage of the first file.

8. A client device comprising:
a memory comprising instructions of a remote desktop application; and
one or more computer processors, wherein the instructions of the remote desktop application, when executed by the one or more computer processors, cause the client device to perform operations comprising:
downloading, by the remote desktop application, from a virtual machine (VM) server and to an association manager on the client device, association information defining which application is configured to open a file based on a type of the file;
detecting an input for opening a first file of the client device at a VM associated with the remote desktop application, the VM executing on the VM server;
detecting that the first file is a local copy of a cloud-based file stored on cloud storage at a cloud storage server;
determining, by the remote desktop application and based on the association information, an application associated with the first file and configured to open the first file, wherein the association information comprises a manifest associated with the application;
sending to the VM server a request to open the first file at the VM with the application, the request comprising an identifier of the cloud-based file in cloud storage of the first file rather than a path to the first file on the client device; and
causing presentation of a user interface (UI) of the application in the remote desktop application, the UI comprising information about the opened first file.

9. The client device as recited in claim 8, wherein the instructions further cause the one or more computer processors to perform operations comprising:
detecting a new input for opening a second file, the second file being a local file stored in a local drive of the client device;
sending to the VM server a request to open the second file; and
sending the second file to the VM server.

10. The client device as recited in claim 8, wherein the VM server is configured to download the first file directly from the cloud storage in response to receiving the request without downloading the first file from the client device.

11. The client device as recited in claim 8, wherein the instructions further cause the one or more computer processors to perform operations comprising:
making an application programming interface (API) call, to a cloud storage application executing on the remote desktop application, to obtain the identifier in cloud storage of the first file.

12. The client device as recited in claim 8, wherein the first file stored in cloud storage is in a folder at the client device synchronized with the cloud storage.

13. The client device as recited in claim 8, wherein the manifest associated with the application comprises an association for the first file and associating the first file with a parameter indicating the identifier in cloud storage of the first file.

14. A computer-implemented method performed by a virtual machine (VM) server, the method comprising:
executing a VM at the VM server;
downloading, from the VM server to a remote desktop application executing on the VM, association information defining which application is configured to open a file based on a type of the file;
receiving a request to open a first file at the VM, the request comprising an identifier in cloud storage of the first file;
detecting that the first file is a local copy of a cloud-based file stored in the cloud storage at a cloud storage server;
downloading the first file from cloud storage based on the identifier to create a local copy of the first file;
determining, by the remote desktop application and based on the association information, an application associated with the first file and configured to open the first file, wherein the association information comprises a manifest associated with the application;
opening, in the VM, the downloaded first file with the application using a path to the local copy of the first file rather than the cloud-based file stored in the cloud storage using the identifier; and
causing presentation of a user interface (UI) of the application in a remote desktop application associated with the VM, the UI comprising information about the opened first file.

15. The computer-implemented method as recited in claim 14, further comprising:
receiving a new request for opening a second file, the second file being a local file stored in a local drive of a client device executing a remote session with the VM; and
opening, in the VM, the second file with the application.

16. The computer-implemented method as recited in claim 14, wherein the first file is in a folder, at a client device executing the remote desktop application, synchronized with the cloud storage.

17. The computer-implemented method as recited in claim 14, further comprising:
when the download of the first file from cloud storage fails, downloading a copy of the first file stored on a client device executing the remote desktop application.

18. The computer-implemented method as recited in claim 14, wherein the manifest associated with the application comprises an association for the first file and associating the first file with a parameter indicating the identifier in cloud storage of the first file.

\* \* \* \* \*